United States Patent [19]

Burbidge et al.

[11] 4,046,671

[45] Sept. 6, 1977

[54] REDUCTION OF PLATINUM GROUP METAL CATALYSTS

[75] Inventors: Bernard Whiting Burbidge, Leatherhead; Terence John Cook, Bexleyheath; Roger Crowson, Richmond, all of England

[73] Assignee: The British Petroleum Company Limited, London, England

[21] Appl. No.: 524,314

[22] Filed: Nov. 15, 1974

[30] Foreign Application Priority Data

Dec. 5, 1973 United Kingdom ............. 56313/73

[51] Int. Cl.$^2$ .................... C10G 35/08; B01J 37/16
[52] U.S. Cl. .................... 208/138; 208/139; 252/415; 252/416; 252/420
[58] Field of Search .............. 208/139, 140, 138; 252/416, 414, 420, 415

[56] References Cited

U.S. PATENT DOCUMENTS

| 2,916,440 | 12/1959 | Ho Gin et al. | 208/140 |
| 3,654,142 | 4/1972 | Moravec, Jr. et al. | 208/140 |
| 3,661,768 | 5/1972 | Davis et al. | 252/415 |
| 3,753,926 | 8/1973 | Hayes | 208/140 |
| 3,764,557 | 10/1973 | Kluksdahl | 208/138 |
| 3,830,727 | 8/1974 | Kluksdahl et al. | 208/140 |
| 3,898,173 | 8/1975 | Hayes | 208/140 |
| 3,904,510 | 9/1975 | Sinfelt et al. | 208/140 |

FOREIGN PATENT DOCUMENTS 917,132  12/1972  Canada .................. 208/140

*Primary Examiner*—Delbert E. Gantz
*Assistant Examiner*—James W. Hellwege
*Attorney, Agent, or Firm*—Morgan, Finnegan, Pine, Foley & Lee

[57] ABSTRACT

A method for reducing catalysts of a platinum group metal on a support comprises contacting the catalyst with a moist flowing stream of hydrogen at elevated temperature. The catalyst is brought to a reducing temperature of at least 300° C in a non-reducing wet atmosphere, before the introduction of the hydrogen.

11 Claims, No Drawings

REDUCTION OF PLATINUM GROUP METAL CATALYSTS

This invention relates to the reduction of catalysts of a platinum group metal on a support, particularly catalysts used for the reforming of petroleum naphthas.

Catalysts of a platinum group metal on a support are used in reduced form in many reactions, such as catalytic reforming, which operate under reducing conditions in the presence of hydrogen. They have, therefore, to be reduced at various times during their life, particularly after oxidative regeneration and/or rejuvenation, but also before their initial use. Normal practice is to start the reduction in the presence of a flowing stream of hydrogen at a low temperature and gradually raise the temperature to the desired reduction temperature.

It has now been found that improved results are obtained if hydrogen does not contact the catalyst until it is at a relatively high temperature and the reduction is carried out under superatmospheric pressure.

According to the present invention there is provided a method for reducing catalysts of a platinum group metal on a support which method comprises contacting the catalyst with hydrogen at elevated temperature characterised in that the catalyst is brought to a reduction temperature of at least 300° C in a non-reducing, preferbly oxidising, atmosphere, before the introduction of the hydrogen and the reduction is carried out under superatmospheric pressure.

The platinum group metals are platinum, palladium, iridium, rhodium, ruthenium and osmium and the present invention may be used with any platinum group metal-containing catalyst, but particularly with reforming catalysts and catalysts containing a platinum group metal as the sole metal component. The catalysts may contain 0.1 to 5% wt. of platinum group metal, particularly 0.2 - 2% wt, and the preferred metal is platinum itself. The support may be a refractory inorganic oxide, particularly alumina, and the catalyst may contain 0.1 - 5% wt. of chlorine.

The method may also be used to treat the so-called bi- or tri-metallic catalysts which may contain in addition to a platinum group metal, 0.1 - 5% wt, particularly 0.2 - 2% wt. of one or two other metals, such as rhenium, lead, germanium, tin or iridium. The term "bi- or tri-metallic catalysts" includes any catalyst of a platinum group metal and one or two other metal components irrespective of whether the other metal component or components are used in reduced metallic form.

The non-reducing atmosphere as previously stated is preferably an oxidising atmosphere. If an oxidising atmosphere is used, the system should obviously be purged free of oxidising gases with an inert gas e.g., nitrogen, prior to the introduction of the hydrogen. The duration of the purge stage should be kept to the minimum necessary to free the system from oxidising material.

When an inert gas such as nitrogen is used as a purge gas, hydrogen may be added on top of the purge gas at the end of the purge stage. Alternatively, the purge gas may be evacuated and replaced by hydrogen. Leaving the purge gas in the system has the advantage that when centrifugal compressors are used, the higher molecular weight of the gaseous mixture enables them to function more easily than when hydrogen alone is present.

The catalyst may be brought to the reducing temperature of at least 300° C by either an upward or downward adjustment of temperature depending on the previous treatment of the catalyst.

Since platinum group metal catalysts normally have lives of several years during which they are regenerated several times, it follows that the most frequent need for reduction comes after a regeneration and/or a regeneration followed by a rejuvenation.

Regeneration is a very well established procedure in which carbonaceous and other deposits are burnt off the catalyst in a stream of oxidising gas, e.g. a stream of nitrogen or other inert gas containing 0.1 - 5% volume of free oxygen at a temperature of 350° - 550° C. The amount of oxygen is carefully controlled in relation to the flow of inert gas and the deposits present to ensure that the maximum temperature is not exceeded.

Rejuvenation is also becoming an accepted procedure. In rejuvenation, a platinum containing catalyst which has been regenerated in a conventional manner to remove deposits is treated with an oxygen-containing gas and chlorine or a chlorine-containing material to restore the catalyst activity.

The main object is to restore the platinum crystallites to their original small size by redispersion, and reverse the tendency of the platinum crystallites to aggregate with extended use. Thus rejuvenation is a standard procedure in reforming processes using the newer bi-metallic catalysts such as platinum-rhenium but can also be usefully applied to the older catalysts containing platinum as the sole metal component. If the catalyst normally contains halogen, the rejuvenation also replaces halogen lost during use and/or the regeneration. The oxidising conditions are normally more severe than those used for regeneration, so the rejuvenated platinum group metal is in a highly oxidised state.

Both the oxygen and the chlorine or chlorine-containing compound play a part in the rejuvenation and water also appears to have some effect. A preferred process of rejuvenation thus treats the catalyst at 400° - 550° C, preferably 490° - 530°, with a gas containing from 0.5 to 20% volume of free oxygen, from 5 - 500 p.p.m. by volume of chloride in the form of chlorine, hydrogen chloride, an organic chlorine-containing compound or a volatile non-metallic inorganic chlorine-containing compound, and from 50 to 20,000 p.p.m. by volume of water.

Other preferred features of the rejuvenation are as follows:

Preferably the amount of oxygen is below 5.6% volume, this being the lower explosive limit for mixtures of hydrocarbons and oxygen, a particularly preferred range being 0.5 - 5% volume. The major part of the gas will be an inert gas, particularly nitrogen, and the desired oxygen concentration can be obtained in conventional manner by mixing air and nitrogen in the required proportions. The total amount of chlorine passes over the catalyst has been found not to be critical within the range 0.2 - 5% wt Cl by weight of catalyst. However, it is preferred to use an amount of chlorine commensurate with the required chlorine content of the treated catalyst, e.g., 0.2 - 2.0% wt. Since the chloride only builds up to an equilibrium level on the catalyst, the chlorine addition can be extended indefinitely.

The chlorine is preferably added as hydrogen chloride or an organic chlorine containing compound, particularly a chlorinated derivative of a $C_1 - C_4$ aliphatic hydrocarbon. Examples of suitable compounds are carbon tetrachloride and propylene dichloride, preference being given to compounds which are liquid at ambient temperature and the pressure of operation, since controlled injection of the chlorine into the gas is thereby facilitated.

The preferred water content of the gas is 200 to 20,000 p.p.m., and a convenient method of controlling the water content is simply to use gas saturated with water vapour at ambient temperature and the pressure of operation.

The pressure may be from 0 to 35 bars gauge, particularly 2 – 10 bars gauge, the amount of water in saturated gas at 3.5 bars gauge being about 7,000 p.p.m. by volume and at 7 bars gauge about 3,500 p.p.m. by volume at ambient temperature.

The gas rate may be from 150 to 7,000 volumes of gas at NTP/volume of catalyst/hour. The time taken will depend on the gas rate, the chloride concentration and the total amount of chlorine to be passed over the catalyst as indicated above and may conveniently be from ½ to 12 hours. Desirably a recycle system is used, the amounts of oxygen, chlorine and water in the recycle gas being monitored and adjusted as necessary. It will be appreciated that care must be taken to avoid damage to the catalyst and particularly to avoid loss of platinum by volatilisation. Within the ranges of process variables given above, conditions may be adjusted, by experiment if necessary, to avoid, on the one hand, excessive severity and, on the other hand, conditions which would have a negligible effect on activity or prolong the treatment unduly. For example, the higher the temperature the less chloride may be used and the higher the pressure the lower the concentration of oxygen.

While the present reduction process is particularly suitable for use after rejuvenation, it is to be understood that it may be used in any situation where the platinum group metal is in an oxidised state and requires reduction. Thus it may be used after a regeneration which is not followed by a rejuvenation and it may be used after a calcination normally given at the end of a catalyst preparation and/or before its first use.

The reduction temperatures is preferably in the range 300° – 550° C preferably 350° – 450° C. There appears to be an optimum temperature somewhere near the middle of the range but the optimum may vary depending on other process conditions, e.g., pressure.

The partial pressure of hydrogen (or total pressure, if undiluted hydrogen is present) may be from 1 to 35 bars gauge, preferably 1 to 14 bars gauge. Higher pressures can be used, but are not economic.

The reduction may be carried out in a static atmosphere of hydrogen or a flowing stream of hydrogen. Thus, the hydrogen flow rate may be from 0 – 6,000 volumes of gas/volume of catalyst/hour and the time may be from 1 to 24 hours. Longer times do not, however, appear to affect further improvement and may sometimes give inferior results. The preferred times are from 1 to 6 hours.

The presence of water in moderate amounts does not appear to be deleterious and some is likely to be present in the system following a rejuvenation. Preferably dry hydrogen is used initially with recycle of the hydrogen, using the standard separator and gas recycle pumps normally available. In these circumstances the water will build up to an equilibrium level of about 1,150 p.p.m. volume at a separator temperature of 23° C and pressure of 24.1 bars gauge.

Some platinum group metal catalysts are preferably used in sulphided form. If so, sulphur may be passed over the catalyst, simultaneously with or subsequently to the reduction, preferably as hydrogen sulphide or an organic sulphur containing compound, particularly a sulphur-containing derivative of a $C_1$ - $C_4$ aliphatic hydrocarbon. The amount of sulphur is desirably from 50 to 250% of the molar amount theoretically required to convert the metal to sulphide, e.g., Pt to PtS. The sulphur is preferably passed over the catalyst in a stream of hydrogen even when subsequent to the reduction; and the sulphiding may conveniently use the same range of temperature and pressures as the reduction step.

The activity of the reduced catalyst and the improvement obtained by the use of the present invention may be determined both by analysis of the catalyst and by activity tests. An important requirement in supported platinum group metal catalysts is a small average metal particle size, preferably not more than 20A diameter. Average metal particle size is measured by dissolving a sample of catalyst in 10% hydrofluoric acid at a temperature below 20° C, filtering off non-dissolved metal particles and measuring their size by X-ray diffraction.

Fresh or rejuvenated oxidised platinum group metal catalysts normally have the metal in a highly dispersed, oxidised form. The reduction process of the present invention minimises the risk of metal aggregation and hence increase the metal particle size during the reduction.

Catalysts reduced by the process of the present invention may be used in any hydrocatalytic process for the conversion of hydrocarbons. Such processes include hydrogenation, dehydrogenation, dehydrocyclisation, hydrodesulphurisation and hydrocracking. They are, as previously stated, particularly suitable for catalytic reforming and the present invention includes a process for the catalytic reforming of hydrocarbons boiling in the range 15° – 250° C comprising contacting the hydrocarbons under reforming conditions with a platinum group metal containing catalyst which has been reduced as described above.

The feedstock may be a single hydrocarbon or a mixture of hydrocarbons, particularly a gasoline fraction boiling within the range 15° – 204° C. Dehydrogenation, dehydrocyclisation, isomerisation, and hydrocracking may be reactions involved in the reforming operation to give a product of increased octane number and/or aromatic content.

The process conditions may be chosen from the following ranges:

| Temperature ° C | 300–600 | preferably | 400–550 |
|---|---|---|---|
| Pressure bars gauge | 1–70 | " | 3–35 |
| Space velocity v/v/hr | 0.1–5 | " | 0.5–5 |
| $H_2$:hydrocarbon mole ratio | 0.1–20.1 | " | 1:1–10:1 |

The invention is illustrated by the following examples.

EXAMPLE 1

The catalyst used was a commercial reforming catalyst of 0.375% wt platinum and 0.4% wt chlorine on gamma-alumina, having a surface area of 140 m²/g. It had been used for a period equivalent to 166 barrels/lb of catalyst and had been regenerated 7 times.

After the last regeneration the catalyst was rejuvenated as follows.

The following conditions were kept constant throughout.

| Pressure | bar (ga) | 3.45 |
| --- | --- | --- |
| Gas recycle rate | vol/vol/hr | 250 |

After starting up with a recycle of pure nitrogen, the following stages, shown in Table 1 below, were carried out.

Table 1

| | (a) Pre-treatment | (b) Main Treatment | (c) Smoothing Step |
| --- | --- | --- | --- |
| Temperature °C | 430 | 510 | 510 - to reduction temp. |
| Gas Composition: | | | |
| O₂ content % vol | 2 | 5 | 5 |
| CCl₄ content p.p.m. vol | Nil | 25 | Nil |
| H₂O content p.p.m. vol | ← 6,500 – 7,000 → | | |
| Duration 13 hours | 6 | 4 | 2 |
| Total Chloride passed (% wt by weight of catalyst) | Nil | 0.6 | Nil |

The chlorine was added as carbon tetrachloride. Reactor exit gas was passed into a separator containing liquid water at ambient temperature and then recycled. The water content was the equilibrium amount at 23° C and 3.45 bar (ga).

Several rejuvenations were carried out under the conditions described above with different portions of the catalyst. At the completion of the rejuvenations the catalyst samples were submitted to various reduction treatments. In each of the reductions the catalyst bed was cooled back to the reduction temperature (smoothing step (c) in Table 1) under recycle in the gas stream containing 5% vol. oxygen. The system was purged with nitrogen and then hydrogen, pressured with hydrogen, recycle established and the reduction treatment carried out.

The reductions were carried out on catalyst beds containing 0.7 liters of catalyst, having a length of 107 cm and a diameter of 2.5 cm. All reductions were carried out in the presence of water, the hydrogen being recycled over water at ambient temperature (23° C)

The reduction conditions and inspection data on the catalyst samples are given in Table 2 below. The catalyst was charged to the reactor as three separate beds and samples from each bed were analysed, being designated "Top, Middle and Bottom Beds" in the downflow reactor.

TABLE 2

| CATALYST | REDUCTION TREATMENT | | | AVERAGE Pt SIZE A | | | SOLUBLE PLATINUM % | | |
| --- | --- | --- | --- | --- | --- | --- | --- | --- | --- |
| | Temp. °C | Pressure (bar ga) | Time h | Top | Middle | Bottom | Top | Middle | Bottom |
| Spent Catalyst, A | ← NIL → | | | ← 36 → | | | ← 5.4 → | | |
| Rejuvenated Catalyst, B | ← NIL → | | | <20 | <20 | <20 | 92 | 89 | 87 |
| Fresh Catalyst, C | ← Prereduced by Manufacturer → | | | <20 | <20 | <20 | 35 | 35 | 35 |
| D (Conventional reduction) | Initially 200° C Raised to 370° C Held at 370° C | | 10 2 | 21 | 20 | <20 | 18 | 18 | 14 |
| E | 300 | | 4 | 19 | 28 | 19 | 57 | 70 | 68 |
| F | " | | 24 | 26 | 23 | 25 | 51 | 60 | 57 |
| G | 370 | | 4 | + <20 | + <20 | + <20 | 35 | 35 | 35 |
| H | " | ↕ 24.1 | 24 | + <20 | + <20 | + <20 | 35 | 35 | 21 |
| I | 450 | | 4 | + <20 | + <20 | + <20 | 19 | 22 | 22 |
| J | " | | 24 | 23 | 21 | <20 | 16 | 24 | 32 |
| K | 510 | | 4 | 20 | 20 | 20 | 16 | 13 | 13 |
| L | " | | 24 | 28 | 25 | <20 | 16 | 22 | 30 |
| M | 370 | ↕ 1 | 24 | | 45 | | | 20 | |
| N | 500 | | 24 | | 30 | | | 26 | |
| O I | 370 | | 4 | + 20 | + 20 | + 20 | 46 | 46 | 43 |
| O II (static pressure of H₂) | 370 | ↕ 3.4 | 4 | <20 | + <20 | + <20 | 35 | 35 | 30 |

TABLE 2-continued

| CATALYST | REDUCTION TREATMENT | | | AVERAGE Pt SIZE A | | | SOLUBLE PLATINUM % | | |
|---|---|---|---|---|---|---|---|---|---|
| | Temp. °C | Pressure (bar ga) | Time h | Top | Middle | Bottom | Top | Middle | Bottom |
| P | 450 | | 4 | + <20 | + <20 | + <20 | 14 | 16 | 19 |

+ amorphous rather than crystalline platinum

Table 2 shows the effectiveness of the rejuvenation in redispersing the platinum crystallites i.e. the average platinum particle size is decreased and the soluble platinum, which can be regarded as highly dispersed platinum in an oxidised form, is increased. It is thought that with a suitable reduction the soluble platinum is converted to finely dicided metallic platinum yielding an active catalyst similar in nature to fresh catalyst. The data shows that on reduction the soluble platinum content of the catalyst samples always decreases. However, under some conditions, platinum crystallisation occurs and this is, of course, undesirable. Although there appears to be a small reduction in the soluble platinum content, at a given reduction temperature, with increasing pressure and extended reduction times, pressures greater than 3.4 bar (ga) and reduction times greater than 4 hours would seem to be unnecessary. A pressure greater than atmospheric would appear to be necessary to produce the "amorphous" form of platinum, but it does not appear necessary to carry out the reduction under recycle (catalyst O II). The reduction temperature appears to be critical, too high or too low a temperature giving rise to platinum crystallite growth.

The preferred reduction conditions i.e. those giving the "amorphous" platinum are:

| Reduction temperature | °C | 350–480 |
|---|---|---|
| Reduction pressure | bar (ga) | 1 < reduction pressure < 24 (preferably 3.4 bar) |
| Reduction Time | (hours) | not greater than 4 |

EXAMPLE 2

Samples of catalysts B, C, H and O(I) of example 1 were tested for reforming activity. As part of the start-up procedure, all catalysts were brought up to 370° C in hydrogen and held at that temperature for 4 hours, before introducing the feed and increasing the temperature to the reforming temperature. In the case of catalysts C, H and O(I), which had already been reduced, this start-up procedure would have had no effect; in the case of the non-reduced catalyst B, this procedure was equivalent to a conventional reduction in situ and the reduced catalyst B can be considered, therefore, as equivalent to catalyst D of Table 2.

The reforming conditions used were:

| Temperature | °C | 500 – 530 |
|---|---|---|
| Pressure | bar (ga) (psig) | 34.5 (500) |
| Space velocity | vol/vol/h | 2 |
| Hydrogen:Hydrocarbon | mole ratio | 5:1 |
| Duration | hours | 400 |
| Feedstock C$_5$ to 160° C (S.G. 0.7325, P/N/A 58/31/11 % wt) | | |

The results obtained are set out in Tables 3 and 4 below.

Table 3

| Catalyst | Reactor temperature (° C) required to give | | |
|---|---|---|---|
| | 90 RON (clear) | 94 RON (clear) | 97 RON (clear) |
| C | 495 | 504.5 | 511.5 |
| B | 496.5 | 508 | 519.5 |
| H | 496 | 505.5 | 514 |
| O(I) | 496 | 506 | 516.5 |

Table 4

| | At 90 RON (clear) | | At 94 RON (clear) | | At 97 RON (clear) | |
|---|---|---|---|---|---|---|
| Catalyst | C$_5$+ yield % wt | H$_2$ make m$^3$/m$^3$ | C$_5$+ yield % wt | H$_2$ make m$^3$/m$^3$ | C$_5$+ yield % wt | H$_2$ make m$^3$/m$^3$ |
| C | 84.2 | 107 | 81.0 | 116 | 77.7 | 120 |
| B | 83.1 | 108.5 | 80.3 | 116.5 | 76.0 | 121 |
| H | 85.3 | 119 | 82.6 | 127 | 79.0 | 132 |
| O (I) | 85.1 | 116 | 81.9 | 126 | 78.4 | 135 |

Table 3 shows that, although the fresh catalyst C had superior activity over all the rejuvenated catalysts, the catalysts H and O(I) had better activity than the conventionally reduced rejuvenated catalyst B.

Table 4 shows that catalysts H and O (I) had advantages in both C$_5$+ liquid yield and hydrogen make over the fresh catalyst, C, which in turn had a yield advantage over the catalyst B. Catalyst H appeared to be better than catalyst O(I) indicating that, after, the preferred reduction, catalysts having lower soluble platinum content, coupled with finely divided platinum (average platinum size of <20A), are desirable. The reduction of the platinum to the amorphous form would appear to be particularly desirable.

We claim:

1. A method for reducing catalysts of a platinum group metal on a support which method comprises contacting the catalyst with hydrogen for a reduction time period in the range of 1 to 24 hours at elevated temperature in the range of 350° to 480° C characterized in that the catalyst is brought to a reduction temperature in the range 350° to 480° C in a non-reducing wet atmosphere before the introduction of hydrogen and the reduction is carried out under superatmospheric pressure without dropping the temperature of the catalyst below 350° C in the presence of moisture to produce amorphous platinum group metal of particle size less than 20A.

2. A method according to claim 1 wherein the non-reducing atmosphere is an oxidising atmosphere.

3. A method according to claim 1 wherein the catalyst contains 0.1 to 5% by weight of a platinum group metal.

4. A method according to claim 1 wherein the platinum group metal is platinum.

5. A method according to claim 1 wherein the support is a refractory inorganic oxide.

6. A method according to claim 5 wherein the support is alumina.

7. A method according to claim 1 wherein the catalyst contains 0.1 to 5% by weight of chlorine.

8. A method according to claim 1 wherein the reduction time is in the range of about 1 to 4 hours.

9. A method according to claim 1 wherein reduction is effected under a partial or total pressure of hydrogen in the range 1 to 35 bars gauge.

10. A method according to claim 1 wherein reduction is effected utilising a flow rate of hydrogen in the range 0 to 6,000 volumes of gas/volume of catalyst/hour.

11. A process for the catalytic reforming of hydrocarbons boiling in the range 15° to 250° C which process comprises contacting the hydrocarbons under reforming conditions with a platinum group metal containing catalyst reduced according to claim 1.

* * * * *